(12) United States Patent
Meixner et al.

(10) Patent No.: US 6,476,094 B1
(45) Date of Patent: Nov. 5, 2002

(54) COMPOSITIONS CONTAINING UNSATURATED POLYESTER RESINS AND THEIR USE FOR THE PRODUCTION OF COATINGS

(75) Inventors: Jürgen Meixner, Krefeld (DE); Wolfgang Fischer, Meerbusch (DE); Manfred Müller, Erkelenz (DE); Claudio Rebuscini, Vignate (IT)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 08/585,330

(22) Filed: Jan. 11, 1996

(30) Foreign Application Priority Data

Jan. 17, 1995 (DE) .......................................... 195 01 176

(51) Int. Cl.$^7$ .................................................. C08F 2/50

(52) U.S. Cl. ........................ 522/104; 522/107; 522/179; 430/285.1; 430/908; 428/480; 428/481; 428/482; 427/487

(58) Field of Search ................................. 522/104, 107, 522/179; 430/285.1, 908; 428/480, 481, 482; 427/487

(56) References Cited

U.S. PATENT DOCUMENTS

| | | | |
|---|---|---|---|
| 3,639,321 A | 2/1972 | Fuhr et al. | 260/28.5 |
| 3,669,716 A | 6/1972 | Keyl et al. | 117/62 |
| 3,898,144 A | 8/1975 | Rudolph et al. | 204/159.15 |
| 4,100,120 A | 7/1978 | Mackawa et al. | 260/22 CB |
| 4,224,430 A | 9/1980 | Mackawa et al. | 526/282 |
| 4,383,902 A | 5/1983 | Frank et al. | 204/159.15 |
| 4,921,883 A | 5/1990 | Meixner et al. | 522/107 |
| 5,252,682 A | 10/1993 | Bayha | 525/445 |

FOREIGN PATENT DOCUMENTS

| | | | |
|---|---|---|---|
| EP | 195968 | 10/1986 | .......... C08G/63/54 |
| JP | 62-114688 | * 5/1987 | |
| LU | 42 334 | 11/1962 | |

OTHER PUBLICATIONS

English translation of EP 0195968, Demmler et al., Oct. 1, 1986.*

Chemical Abstracts, vol. 107, No. 12, Sep. 12, 1987 Abstract No. 98299e & JP 62 114 688 A Nappon Sythetic Chemical Ind. Co., LTF) May 26, 1987.

Chemical Abstracts, vol. 118, No. 12, Mar. 22, 1993, Abstract No. 104830s & ZH. PRIKL. KHIM Bd 65, Nr. 6, 1992–S.–Peterburg, p. 1402–7, N.G. Videnina et al.

* cited by examiner

*Primary Examiner*—Laura Weiner
(74) *Attorney, Agent, or Firm*—Joseph C. Gil; Diderico van Eyl; Thomas W. Roy

(57) ABSTRACT

The present invention relates to compositions that may be cured under the action of UV radiation and contain A) 40 to 80 parts by weight of a polyester resin component containing one or more ethylenically unsaturated polyester resins prepared from a carboxylic acid component containing a 1,2-alkenyl dicarboxylic acid monodicyclopentenyl ester and fumaric acid, maleic acid and/or maleic anhydride and an alcohol component containing a dyhydric alcohol, B) 20 to 60 parts by weight of a copolymerizable monomer such as styrene and C) 0.1 to 10 parts by weight of a photoinitiator.

The present invention also relates to coated substrates, in particular wood or imitation wood, prepared from these compositions at an application viscosity of less than 60 seconds measured at 23° C. in a DIN 4 cup to DIN 53211 under the action of UV radiation.

11 Claims, No Drawings

COMPOSITIONS CONTAINING UNSATURATED POLYESTER RESINS AND THEIR USE FOR THE PRODUCTION OF COATINGS

BACKGROUND OF THE INVENTION

1. Field of the Invention

This invention relates to novel mixtures, curable under the action of UV radiation, containing unsaturated polyester resins and to the use thereof for the production of coatings on any desired substrates, in particular on wood or imitation wood.

2. Description of the Prior Art

Unsaturated polyester resins have long been known as binders for UV-curing coatings. DE-AS 1,694,149, for example, discloses that mixtures of unsaturated polyesters and polymerizable monomers may be cured by UV radiation with the addition of certain benzoin compounds. Due to the inhibitory action of atmospheric oxygen, lacquer coatings based on this system are often inadequately cured on the surface.

The addition of paraffins ("paraffin polyesters"), which accumulate on the surface during gelation, to avoid air inhibition in the case of conventional curing with peroxides is possible only to a certain extent because the thermal energy emitted by the UV light sources prevents the formation of the protective paraffin film. In these cases, a prior so-called pregelling zone must be provided.

Unsaturated polyesters which contain α,β-unsaturated dicarboxylic acid residues and allyl ether and/or polyalkylene glycol residues ("gloss polyesters") require no paraffin for curing the surface of the lacquer film because the ether groups initiate an autooxidative drying process. UV curing of such resins with allyl ether groups (DE-OS 2,113,998) or polyalkylene glycol residues (DE-OS 3,010,428) results, as does conventional curing, in readily sandable coatings, but the reactivity of such resins is often too low to ensure sufficiently high processing speeds.

EP-A 0,195,968 describes curable resin compositions based on one or more unsaturated polyesters which contain terminal dicyclopentenyl ester groups and are thus intended to exhibit extended storage stability. However, the claimed polyester resins are not suitable for curing under UV light.

EP-A- 0,284,888 describes unsaturated polyesters which, due to the incorporation of inter alia norbornene dicarboxylic acid residues, combine good levelling with rapid curing. However, this applies only at an application viscosity for curtain coating of>60 seconds (DIN 4 cup, 23° C.), which is achieved by dilution with styrene. Recently, however, there has been demand for binders which are equally rapidly curable at still greater dilution, i.e., at an application viscosity for curtain coating of<60 seconds, and in which the properties of the resulting coatings, such as hardness and scratch resistance, do not worsen. Lower viscosity is associated with advantages in deaeration and levelling of the lacquer films.

An object of the present invention is to provide unsaturated polyester resins which are suitable for the production of coating compositions which may be crosslinked under the action of UV radiation and cure rapidly with good levelling even when highly diluted with styrene and/or at a low application viscosity.

Surprisingly, this object may be achieved with the compositions according to the invention described hereinafter, which contain polyester resins as the primary component. Achieving the stated object is surprising because the desired more rapid curability even when highly diluted with styrene is not solely dependent upon the concentration of the olefinic double bonds incorporated in the polyester resins as would be expected, but may instead only be achieved if structural components a1) and a2) are simultaneously incorporated into the polyester resins in the quantities disclosed in greater detail below.

SUMMARY OF THE INVENTION

The present invention relates to compositions that may be cured under the action of UV radiation and contain A) 40 to 80 parts by weight of a polyester resin component containing one or more ethylenically unsaturated polyester resins which have an acid value of 0 to 50 and a hydroxyl value of 10 to 150 and are the reaction product of
   a) 35 to 50 mole % of a carboxylic acid component containing
      a1) 5 to 35 mole % of a 1,2-alkenyl dicarboxylic acid monodicyclopentenyl ester,
      a2) 50 to 95 mole % of fumaric acid, maleic acid and/or maleic anhydride and
      a3) 0 to 20 mole % of a carboxylic acid and/or a carboxylic anhydride other than a1) and a2) with
   b) 50 to 65 mole % of an alcohol component containing
      b1) 75 to 100 mole % of a dihydric alcohol,
      b2) 0 to 25 mole % of a monohydric alcohol and
      b3) 0 to 10 mole % of a trihydric alcohol, B) 20 to 60 parts by weight of a monomer component containing one or more copolymerizable monomers and C) 0.1 to 10 parts by weight of an initiator component containing one or more photoinitiators, wherein the parts by weight of A) and B) and the percentages of a) and b) each add up to 100.

The present invention also relates to coated substrates, in particular wood or imitation wood, prepared from these compositions at an application viscosity of less than 60 seconds measured at 23° C. in a DIN 4 cup to DIN 53211 under the action of UV radiation.

DETAILED DESCRIPTION OF THE INVENTION

Polyester resins A) have an acid value of 0 to 50, preferably 5 to 40 mg KOH/g; a hydroxyl value of 10 to 150, preferably 10 to 130 mg KOH/g; and a number average molecular weight ($M_n$, which may be determined by vapor pressure osmometry) of 300 to 5000, preferably 500 to 2000.

The polyester resins according to the invention are produced using known methods, for example by melt or azeotropic esterification of alcohols and acids or the esterifiable derivatives thereof, c.f. Methoden der organischen Chemie (Houben-Weyl), 4th edition, volume 14/2, Georg Thieme Verlag, Stuttgart 1961, page 1 to 5, 21 to 33, 40 to 44.

The polyester resins are produced by reacting components a1) to a3) and b1) to b3) in the previously disclosed ratios. Component a) preferably contains 6 to 30 mole % of a1), 60 to 94 mole % of a2) and 0 to 15 mole % of a3). Component b) preferably contains 80 to 95 mole % of b1), 5 to 20 mole % of b2) and 0 to 5 mole % of b3). 1,2-alkenyl dicarboxylic acid monodicyclopentenyl ester a1) is the reaction product of maleic acid and dicyclopentadiene and is preferably produced in a preceding stage by heating a mixture of 1.0 mole of maleic anhydride, 1.0 mole of water and 1.0 mole of dicyclopentadiene at a temperature of 80 and 140° C.

Once the remaining components have been added, esterification proceeds under an inert gas atmosphere at temperatures of 140 to 230° C. For the esterification reaction the starting materials are preferably used in quantities corresponding to an OH/COOH equivalent ratio of 1:1 to 1.5:1, in which acid anhydride groups considered for purposes of this calculation as divalent groups.

Component a2) is selected from fumaric acid, maleic acid and/or maleic anhydride.

Component a3) is selected from saturated or unsaturated aliphatic dicarboxylic acids having 4 to 10 carbon atoms other than those set forth for component a2), such as succinic acid, adipic acid, sebacic acid, itaconic acid and/or anhydrides of such acids; cycloaliphatic dicarboxylic acids or dicarboxylic anhydrides having 8 to 10 carbon atoms, such as tetrahydrophthalic acid, hexahydrophthalic acid, norbornene dicarboxylic acid and their anhydrides; aromatic dicarboxylic acids having 8 carbon atoms or their anhydrides, such as phthalic acid, phthalic anhydride, isophthalic acid and terephthalic acid; and aliphatic, cycloaliphatic and/or aromatic monocarboxylic acids having 2 to 10 carbon atoms, such as benzoic acid, acetic acid, cyclohexane carboxylic acid and 2-ethyl-hexanoic acid.

Component b1) is selected from dihydric alcohols having 2 to 15 carbon atoms, such as ethylene glycol, 1,2-propanediol, 1,3-propanediol, diethylene glycol, dipropylene glycol, the isomeric butanediols, neopentyl glycol, 1,6-hexanediol, 2-ethylhexanediol and tripropylene glycol. Ethylene glycol, 1,2-propanediol, 1,3-propanediol, diethylene glycol and dipropylene glycol are preferred.

Component b2) is selected from monohydric alcohols having 1 to 12 carbon atoms, such as methanol, ethanol, n-hexanol, isooctanol, n-decanol, diethylene glycol monobutyl ether and benzyl alcohol.

Component b3) is selected from tri- to tetrahydric alcohols having 3 to 20 carbon atoms such as glycerol, trimethylolpropane, pentaerythritol and their alkoxylation products containing ether groups and up to 20 carbon atoms.

In order to protect the polyester resins from unwanted premature polymerization, it is often advisable to add during their production 0.001 to 0.1 wt. %, based on the weight of the starting materials used for the production of the polyesters, of known polymerization inhibitors or antioxidants, such as the quinones, hydroquinones, copper compounds, phosphites, amines or phenols conventionally used for this purpose.

Styrene is preferably used as all or a portion of component B) in the compositions according to the invention. However, other copolymerizable monomers, such as (meth)acrylic acid esters and monomers containing vinyl ether groups may also be used as component B) or as a proportion of component B).

Suitable photoinitiators C) are known and include those described, for example, in Methoden der organischen Chemie (Houben-Weyl), volume E 20, page 80 et seq., Georg Thieme Verlag, Stuttgart 1987. Examples include benzoin ethers such as benzoin isopropyl ether, benzil ketals such as benzil dimethyl ketal, and hydroxyalkyl phenones such as 1-phenyl-2-hydroxy-2-methylpropan-1-one and benzophenone and the derivatives thereof.

The photoinitiators are used in quantities of 0.1 to 10 wt. %, preferably 0.1 to 5 wt. %, based on the weight of the compositions according to the invention. Either one photoinitiator may be used or mixtures of different photoinitiators may be used to obtain advantageous synergistic effects.

The compositions according to the invention may optionally contain known additives D), which include inhibitors, metal compounds, carriers, extenders, thixotroping agents, levelling agents, and smoothing and flatting agents.

The compositions according to the invention are suitable for coating various substrates, such as paper, plastic films, paperboard and in particular wood or imitation wood. Application may be achieved using any methods conventional in lacquer technology such as curtain coating, spraying and rolling. The "delivery form" of the compositions according to the invention frequently differs from the finally used "application form" by the addition of a further quantity of component B), in particular styrene, to reduce the viscosity. Both the "delivery form" and the "application form" of the composition preferably fall within the previously disclosed ranges.

All percentages stated in the following examples are weight percentages, unless otherwise indicated.

EXAMPLES

Maleic Acid Monodicyclopentenyl Ester a1)

1.0 mole of maleic anhydride and 1.0 mole of dicyclopentadiene were heated to 60° C. while being perfused with nitrogen. After the addition of 1.0 mole of water, the mixture was heated to 120° C. and maintained at 120° C. for 4 hours.

Examples 1 to 5 and Comparative Examples 6 to 9

The raw materials set forth in table 1 were heated to 190° C. together with 0.02%, based on solids, of toluhydroquinone while being perfused with nitrogen and were maintained at this temperature until a viscosity (70% in styrene, DIN 4 cup, 23° C.) of approximately 150 seconds was achieved. At this viscosity, the temperature was reduced to 160° C. and the products were maintained at this temperature to a final viscosity (70% in styrene, 23° C.) of approximately 200 seconds. After cooling to 100° C., 70% solutions of the resultant products in styrene were prepared.

The acid values of the 70% styrene solutions were 10 to 30 mg KOH/g, based on solids, and the hydroxyl values were 10 and 60 mg KOH/g, based on solids.

TABLE 1

| Raw Materials (moles) | Examples according to the invention | | | | | Comparative Examples | | | |
|---|---|---|---|---|---|---|---|---|---|
| | 1 | 2 | 3 | 4 | 5 | 6 | 7 | 8* | 9** |
| Maleic acid monodicyclopentyl ester | 0.15 | 0.15 | 0.22 | 0.28 | 0.08 | 0.15 | | 0.075 | |
| Maleic anhydride | | 0.92 | 0.89 | 0.86 | 0.96 | 0.20 | 1.00 | | 0.70 |
| Fumaric acid | 0.92 | | | | | | | 0.057 | |

TABLE 1-continued

| Raw Materials (moles) | Examples according to the invention | | | | | Comparative Examples | | | |
|---|---|---|---|---|---|---|---|---|---|
| | 1 | 2 | 3 | 4 | 5 | 6 | 7 | 8* | 9** |
| Adipic acid | | | | | | 0.72 | | 0.943 | |
| Norbornene dicarboxylic acid | | | | | | | | | 0.30 |
| Ethylene glycol | 0.70 | 0.70 | 0.70 | 0.70 | 0.70 | 0.70 | 0.70 | | 0.70 |
| Diethylene glycol | 0.30 | | 0.30 | 0.30 | 0.30 | 0.30 | 0.30 | | 0.30 |
| Benzyl alcohol | | 0.15 | 0.15 | 0.15 | 0.15 | 0.15 | 0.15 | | 0.20 |
| Diethylene glycol monobutyl ether | 0.05 | 0.05 | 0.05 | 0.05 | 0.05 | 0.05 | 0.05 | | |
| Cyclohexanol | 0.17 | | | | | | | | |
| Neopentyl glycol | | | | | | | | 1.038 | |
| 1,2-propanediol | | 0.30 | | | | | | | |

*corresponds to example 1c of EP 195 968
**corresponds to example 1 of EP 284 888 (U.S. Pat. No. 4,921,883).

After adding 3 parts by weight of benzil dimethyl ketal, 2 parts by weight of a known levelling agent (1% solution in toluene of a silicone oil, Baysilon-Lackadditiv-PL, manufacturer: Bayer AG, Leverkusen) and sufficient styrene to achieve an application viscosity of 40 seconds (DIN 4 cup, 23° C.), the compositions were curtain coated to a film thickness of 250 μm onto wood. Curing was performed under 2 IST light sources (impulse light sources from IST-Strahlentechnik, power output 80 Watt/cm, distance from light source 20 cm) at a belt speed of 3 m/min.

Table 2 illustrates the excellent hardness of examples 1 to 5 according to the invention combined with good levelling and good scratch resistance. Comparative examples 6 and 7 clearly demonstrate that increasing the concentration of double bonds was not sufficient to accelerate curing of these styrene-diluted coating compositions. Comparative example 7 also contained an increased concentration of maleic acid. It may be seen from comparative example 9 that combining maleic anhydride and norbornene dicarboxylic acid was failed to accelerate cure. It was only with the combination according to the invention of maleic acid monodicyclopentenyl ester and maleic anhydride or fumaric acid that rapidly cured coatings were obtained, even when the compositions were diluted with styrene.

TABLE 2

| | Examples according to the invention | | | | | Comparative examples | | | |
|---|---|---|---|---|---|---|---|---|---|
| | 1 | 2 | 3 | 4 | 5 | 6* | 7** | 8* | 9 |
| Levelling[1] | 0 | 0 | 0 | 0–1 | 0 | | 0 | | 0–1 |
| Scratch resistance[2] | 0 | 0 | 0–1 | 0 | 0–1 | | 3 | | 3 |
| Hardness (seconds)[3] | 120 | 130 | 108 | 111 | 105 | | 55 | | 17 |

*Coatings could not be tested due to tacky surface (not cured).
**Coatings were milky/turbid.
[1]Scale 0 to 5
0 = very good levelling
5 = no levelling
[2]Scale 0 to 5 (nail hardness)
0 = very good scratch resistance
5 = no scratch resistance
[3]Hardness was determined using the König method (DIN 53157/pendulum damping).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition that may be cured under the action of UV radiation and contains
   A) 40 to 80 parts by weight of a polyester resin component containing one or more ethylenically unsaturated polyester resins which have an acid value of 0 to 50 and a hydroxyl value of 10 to 150 and are the reaction product of
      a) 35 to 50 mole % of a carboxylic acid component consisting of
         a1) 5 to 35 mole % of a 1,2-alkenyl dicarboxylic acid monodicyclopentenyl ester,
         a2) 50 to 95 mole % of fumaric acid, maleic acid and/or maleic anhydride and
         a3) 0 to 15 mole % of a carboxylic acid and/or a carboxylic anhydride other than a1) and a2) with
      b) 50 to 65 mole % of an alcohol component consisting of
         b1) 80 to 95 mole % of a dihydric alcohol,
         b2) 5 to 20 mole % of a saturated monohydric alcohol and
         b3) 0 to 5 mole % of a trihydric alcohol,
   B) 20 to 60 parts by weight of a monomer component containing one or more copolymerizable monomers and
   C) 0.1 to 10 parts by weight of an initiator component containing one or more photoinitiators, wherein the parts by weight of A) and B) and the percentages of a) and b) each add up to 100.

2. The composition of claim 1 wherein component a) consists of 6 to 30 mole % of a1), 60 to 94 mole % of a2) and 0 to 15 mole % of a3).

3. The composition of claim 2 wherein component B) consists of styrene.

4. The composition of claim 1 wherein component B) consists of styrene.

5. A coated substrate prepared by coating a substrate with the composition of claim 1 and curing the coating by the application of UV radiation.

6. A coated substrate prepared by coating a wood or imitation wood substrate with the composition of claim 1 and curing the coating by the application of UV radiation.

7. The composition of claim 1 wherein component b2) is selected from the group consisting of methanol, ethanol, n-hexanol, isooctanol, n-decanol, diethylene glycol monobutyl ether and benzyl alcohol.

8. A composition that may be cured under the action of UV radiation and contains
- A) 40 to 80 parts by weight of a polyester resin component containing one or more ethylenically unsaturated polyester resins which have an acid value of 0 to 50 and a hydroxyl value of 10 to 150 and are the reaction product of
  - a) 35 to 50 mole % of a carboxylic acid component consisting of
    - a1) 5 to 35 mole % of a 1,2-alkenyl dicarboxylic acid monodicyclopentenyl ester,
    - a2) 50 to 95 mole % of fumaric acid, maleic acid and/or maleic anhydride and
    - a3) 0 to 15 mole % of a carboxylic acid and/or a carboxylic anhydride other than a1) and a2) with
  - b) 50 to 65 mole % of an alcohol component consisting of
    - b1) 80 to 95 mole % of a dihydric alcohol selected from the group consisting of ethylene glycol, 1,2-propanediol, 1,3-propanediol, diethylene glycol, dipropylene glycol, the isomeric butanediols, neopentyl glycol, 1,6-hexanediol, 2-ethylhexanediol and tripropylene glycol,
    - b2) 5 to 20 mole % of a saturated monohydric alcohol and
    - b3) 0 to 5 mole % of a trihydric alcohol,
- B) 20 to 60 parts by weight of a monomer component containing one or more copolymerizable monomers and
- C) 0.1 to 10 parts by weight of an initiator component containing one or more photoinitiators, wherein the parts by weight of A) and B) and the percentages of a) and b) each add up to 100.

9. The composition of claim 8 wherein component a) consists of 6 to 30 mole % of a1), 60 to 94 mole % of a2) and 0 to 15 mole % of component a3).

10. The composition of claim 9 wherein component B) consists of styrene.

11. The composition of claim 8 wherein component b2) is selected from the group consisting of methanol, ethanol, n-hexanol, isooctanol, n-decanol, diethylene glycol monobutyl ether and benzyl alcohol.

* * * * *